(12) United States Patent
Takeuchi

(10) Patent No.: US 8,289,549 B2
(45) Date of Patent: Oct. 16, 2012

(54) CONTROLLER UNIT, METHOD OF CONTROLLING IMAGE PROCESSING, AND RECORDING MEDIUM

(75) Inventor: Hiroaki Takeuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 911 days.

(21) Appl. No.: 12/379,349

(22) Filed: Feb. 19, 2009

(65) Prior Publication Data

US 2009/0213437 A1     Aug. 27, 2009

(30) Foreign Application Priority Data

Feb. 22, 2008  (JP) ................................ 2008-041395
Jan. 19, 2009  (JP) ................................ 2009-008994

(51) Int. Cl.
  *G06F 3/12* (2006.01)
  *H04N 1/00* (2006.01)
(52) U.S. Cl. ...................................... 358/1.15; 358/1.1
(58) Field of Classification Search .................. 358/1.1, 358/1.9, 1.13, 1.14, 1.15, 400, 445, 448, 358/474, 464, 521, 530
See application file for complete search history.

(56) References Cited

U.S. PATENT DOCUMENTS

| | | | | |
|---|---|---|---|---|
| 5,177,603 | A * | 1/1993 | Kojima | 358/518 |
| 5,196,943 | A * | 3/1993 | Hersee et al. | 358/403 |
| 6,075,547 | A | 6/2000 | Takeuchi | 347/116 |
| 6,498,912 | B1 * | 12/2002 | Leni et al. | 399/79 |
| 7,173,724 | B2 * | 2/2007 | Nomura et al. | 358/1.15 |
| 7,733,513 | B2 * | 6/2010 | Nishimura | 358/1.15 |
| 8,059,299 | B2 * | 11/2011 | Sugishita et al. | 358/1.16 |
| 2006/0215288 | A1 | 9/2006 | Takeuchi | 360/2 |

FOREIGN PATENT DOCUMENTS

JP     2006-325260     11/2006

* cited by examiner

*Primary Examiner* — Gabriel Garcia
(74) *Attorney, Agent, or Firm* — Harness, Dickey & Pierce, P.L.C.

(57) ABSTRACT

A scanner image-processing unit includes a scanner-property adjusting unit that converts image data from a scanner unit into normalized image data and a first image processing unit that performs a first image processing on the normalized image data to generate output image data. If a controller image-processing unit that performs a second image processing on the image data from the scanner unit is connected, a configuration control unit disables an operation of the first image processing unit and controls the controller image-processing unit to perform the second image processing on the normalized image data to generate the output image data.

13 Claims, 15 Drawing Sheets

FIG. 3

| BIT | 4 | 3 | 2 | 1 | 0 |
|---|---|---|---|---|---|
| FUNCTION | NOT USED | SCANNER-PROPERTY ADJUSTING UNIT | SIMPLE IMAGE-PROCESSING UNIT | NOT USED | NOT USED |
| OPERATION MODE VALUE 0 | 0 | 1 | 1 | 0 | 0 |
| OPERATION MODE VALUE 1 | 0 | 1 | 0 | 0 | 0 |

FIG. 4

| BIT | 4 | 3 | 2 | 1 | 0 |
|---|---|---|---|---|---|
| FUNCTION | COMPRESSING UNIT | NOT USED | IMAGE PROCESSING UNIT | EXPANDING UNIT | STORAGE CONTROL UNIT |
| OPERATION MODE VALUE 0 | 1 | 0 | 1 | 1 | 1 |
| OPERATION MODE VALUE 1 | 1 | 0 | 1 | 1 | 0 |

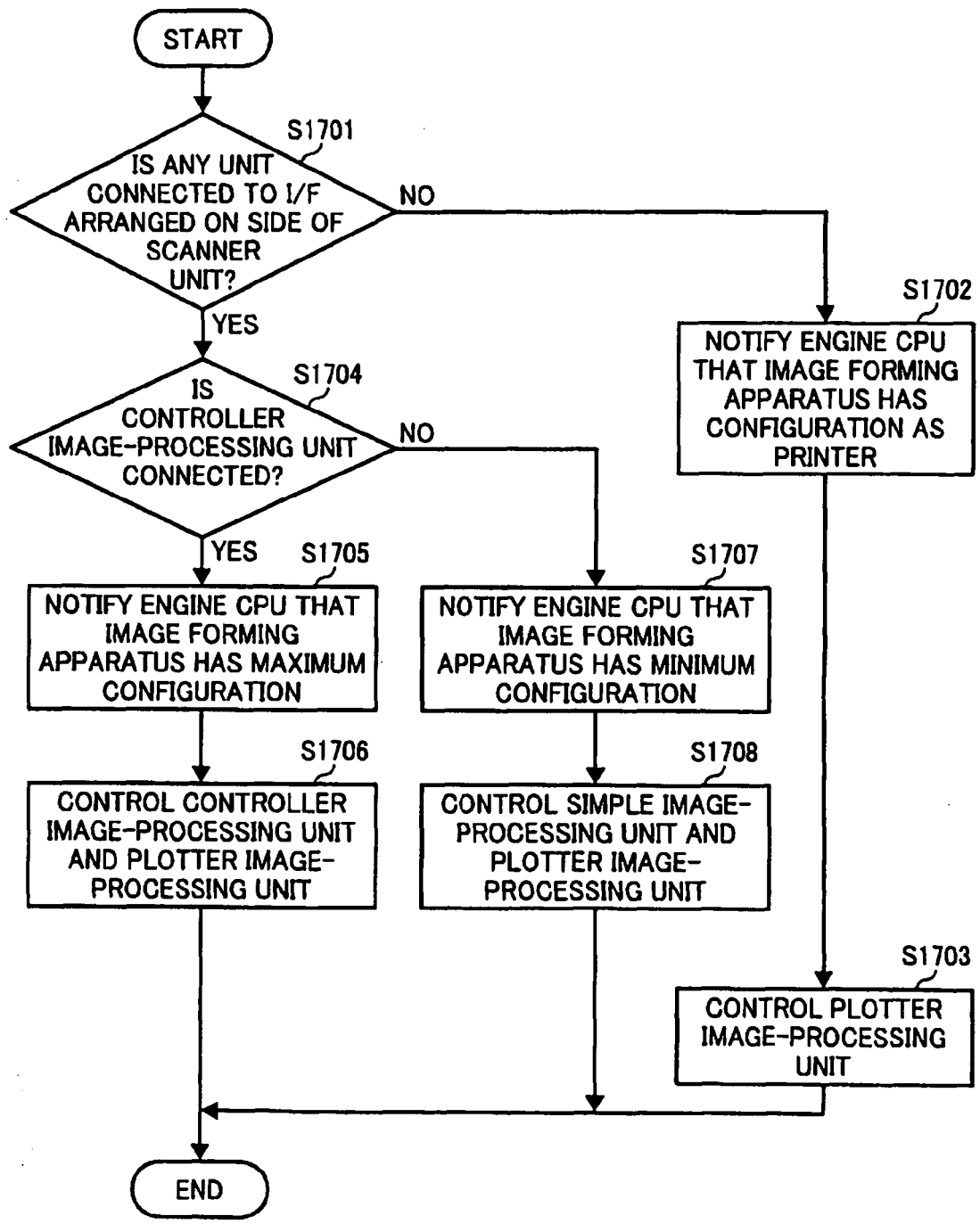

CONTROLLER UNIT, METHOD OF CONTROLLING IMAGE PROCESSING, AND RECORDING MEDIUM

CROSS-REFERENCE TO RELATED APPLICATIONS

The present application claims priority to and incorporates by reference the entire contents of Japanese priority document 2008-041395 filed in Japan on Feb. 22, 2008 and Japanese priority document 2009-008994 filed in Japan on Jan. 19, 2009.

BACKGROUND OF THE INVENTION

1. Field of the Invention

The present invention relates to a technology for controlling an image processing on image data obtained by reading an image of an original.

2. Description of the Related Art

It is difficult to manufacture an image forming apparatus (image processing apparatus) such as a multifunction product (MFP) with high processing speed at low cost and with less development effort, because the processing speed, the cost, and the development effort have a trade-off relationship.

For example, the image forming apparatus can be manufactured at low cost by combining a scanner function, an image processing function, and an output function; however, such image forming apparatus requires a large-scale processing unit, which causes a significant development effort. If a scanner device, a plotter device, and the like are individually connected on a network, the image forming apparatus can be built with less development effort; however, a data transmission speed between the devices is decreased, which results in a lower processing speed of the image forming apparatus. Similarly, to provide an image forming apparatus with high processing speed, the image forming apparatus needs to have the scanning function, the image processing function, and the output function in a combined manner, which causes a significant development effort as described above.

In recent years, there has been a requirement for a product lineup of the same model series in which a plurality of types of image forming apparatuses including a high-end image forming apparatus having a large number of functions and a low-end image forming apparatus having a small number of functions are provided. If an image forming apparatus having all extended functions in a combined manner is employed to meet the requirement, although it is possible to provide the high-end image forming apparatus with ease, it is disadvantageous in the case of the low-end image forming apparatus because the cost of the image forming apparatus increases.

To improve the flexibility of extendability, Japanese Patent Application Laid-open No. 2006-325260 discloses a technology in which an image reading device having a scanner function and a storage function is added on an image forming apparatus having a plotter function, so that the image forming apparatus having a copy function is provided. In this case, data obtained by reading an image of an original is temporarily stored in a storage device by using the storage function whereby the copy function can be performed with high processing speed at low cost.

However, in the above technology, each of the image forming apparatus and the image reading device needs to include a central processing unit (CPU), a read-only memory (ROM), and a hard disk drive (HDD), which increases the costs of the image forming apparatus and the image reading device. When the image reading device is added on the image forming apparatus, the CPU included in the image reading device is configured to control the image forming apparatus. However, because software for controlling the image forming apparatus is usually large-scaled, the image reading device needs to include relatively large-scale ROM and random access memory (RAM) or a CPU with higher processing performance, which further increases the cost.

If a scanner function is added to a printer, the printer can function as a copier. However, because the configuration of the copier cannot be changed, it is difficult to provide an inexpensive copier without an HDD.

SUMMARY OF THE INVENTION

It is an object of the present invention to at least partially solve the problems in the conventional technology.

According to one aspect of the present invention, there is provided a controller unit that controls an image processing apparatus that includes a scanner unit that reads an image of an original and outputs image data. The controller unit includes a scanner image-processing unit including a scanner-property adjusting unit that converts the image data from the scanner unit into normalized image data, and a first image processing unit that performs a first image processing on the normalized image data to generate first output image data; and a configuration control unit that, if a controller image-processing unit that performs a second image processing on the image data from the scanner unit is connected, disables an operation of the first image processing unit and controls the controller image-processing unit to perform the second image processing on the normalized image data to generate second output image data.

Furthermore, according to another aspect of the present invention, a method of controlling an image processing apparatus that includes a scanner unit that reads an image of an original and outputs image data includes converting the image data from the scanner unit into normalized image data; first image processing including performing a first image processing on the normalized image data to generate first output image data; and configuration controlling including disabling, if a controller image-processing unit that performs a second image processing on the image data from the scanner unit is connected, an operation of the first image processing, and controlling the controller image-processing unit to perform the second image processing on the normalized image data to generate second output image data.

Moreover, according to another aspect of the present invention, there is provided a computer-readable recording medium that stores there in a computer program for controlling an image processing apparatus that includes a scanner unit that reads an image of an original and outputs image data. The computer program when executed causes a computer to execute converting the image data from the scanner unit into normalized image data; first image processing including performing a first image processing on the normalized image data to generate first output image data; and configuration controlling including disabling, if a controller image-processing unit that performs a second image processing on the image data from the scanner unit is connected, an operation of the first image processing, and controlling the controller image-processing unit to perform the second image processing on the normalized image data to generate second output image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table for explaining data stored in a control register included in a scanner image-processing unit shown in FIG. 2;

FIG. 4 is a table for explaining data stored in a control register included in a controller image-processing unit shown in FIG. 2;

FIG. 17 is a flowchart of an operation performed by the controller unit to determine the configuration of the image forming apparatus.

DETAILED DESCRIPTION OF THE PREFERRED EMBODIMENTS

Exemplary embodiments of the present invention are explained in detail below with reference to the accompanying drawings.

Figure 1:
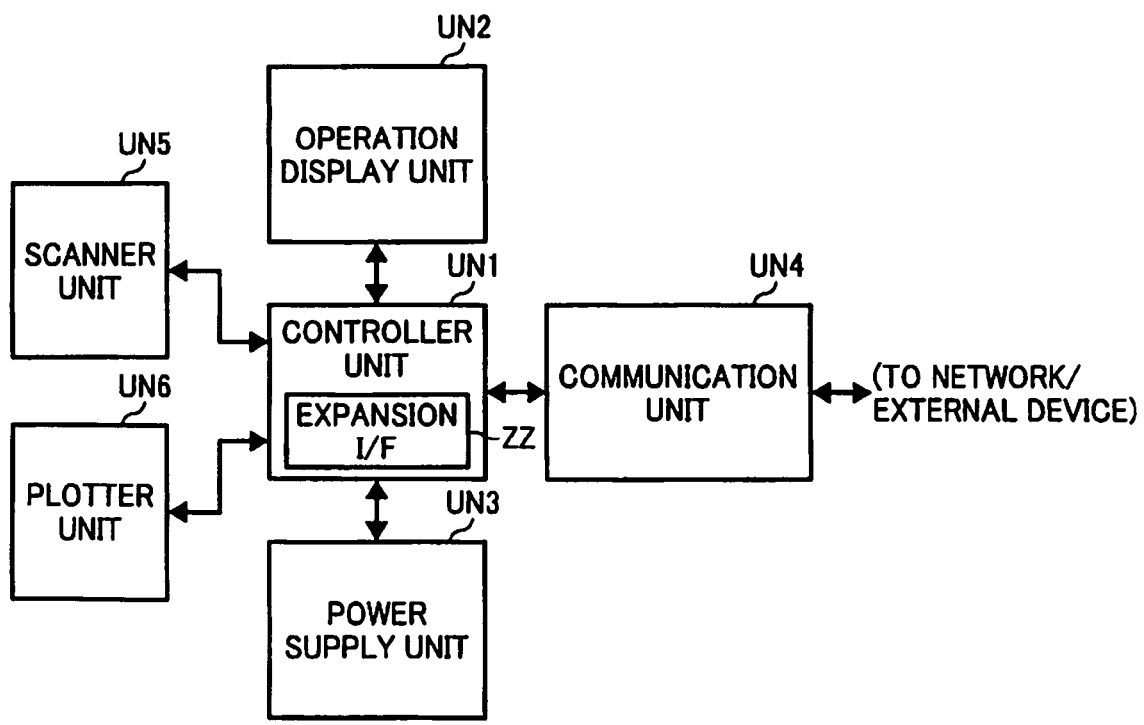
FIG. 1 is a block diagram of an image forming apparatus (image processing apparatus) according to a first embodiment of the present invention.

FIG. 1 is a block diagram of an image forming apparatus (image processing apparatus) according to a first embodiment of the present invention.

The image forming apparatus includes a controller unit UN1, an operation display unit UN2, a power supply unit UN3, a communication unit UN4, a scanner unit UN5, and a plotter unit UN6. The controller unit UN1 controls an operation of each unit included in the image forming apparatus. The operation display unit UN2 includes a user interface (I/F) (not shown) that is used for a user to operate the image forming apparatus. The power supply unit UN3 supplies power to each unit included in the image forming apparatus. The communication unit UN4 is connected to an external device (not shown) or a network (not shown), so that the communication unit UN4 transmits and receives various information to and from the external device or a terminal device (not shown) via the network. The scanner unit UN5 reads an image of an original thereby generating image data. The plotter unit UN6 outputs a copy image, a print image, or the like, to a recording medium.

Among the units included in the image forming apparatus, the scanner unit UN5 and the plotter unit UN6 are detachably attached to the image forming apparatus. A plurality of types of scanner units and plotter units can be selectively used as the scanner unit UN5 and the plotter unit UN6 to be connected to the image forming apparatus as appropriate as long as they are in conformity with a predetermined interface specification (which defines physical requirement or requirement of signal input/output). For example, the types of the scanner unit UN5 include the one having an automatic document feeder (ADF), the one having a function of reading an image of an original in black and white, and the one having a function of reading an image of an original in colors. The types of the plotter unit UN6 include the one having a function of post-print processing (sorting, stapling, folding, and the like), the one having a function of printing in black and white, and the one having a function of printing in colors.

Similarly, a plurality of types of communication units can be selectively used as the communication unit UN4 to be connected to the image forming apparatus as appropriate in accordance with the configuration of the image forming apparatus. For example, the types of the communication unit UN4 include the one having a host I/F for connecting to a host apparatus such as a personal computer (PC) and a network I/F for connecting to a network and the one having only the host I/F. Furthermore, depending on the configuration of the image forming apparatus, the communication unit UN4 is not connected to the image forming apparatus, which is so-called a stand-alone configuration such as a copier.

For example, if both the scanner unit UN5 and the plotter unit UN6 are connected to the image forming apparatus, it is possible to provide the image forming apparatus having a copy function, a printer function, a network printer function, a network facsimile function, a network scanner function, and the like. The communication unit UN4 having an appropriate function is connected to the image forming apparatus depending on the functions included in the image forming apparatus.

If only the plotter unit UN6 is connected to the image forming apparatus, it is possible to provide the image forming apparatus having the printer function and the network printer function. The communication unit UN4 having an appropriate function is connected to the image forming apparatus depending on the functions included in the image forming apparatus.

The controller unit UN1 includes an expansion I/F ZZ to which an option board can be connected. If the option board is connected to the expansion I/F ZZ, image processing can be performed by using a function included in the option board.

Figure 2:
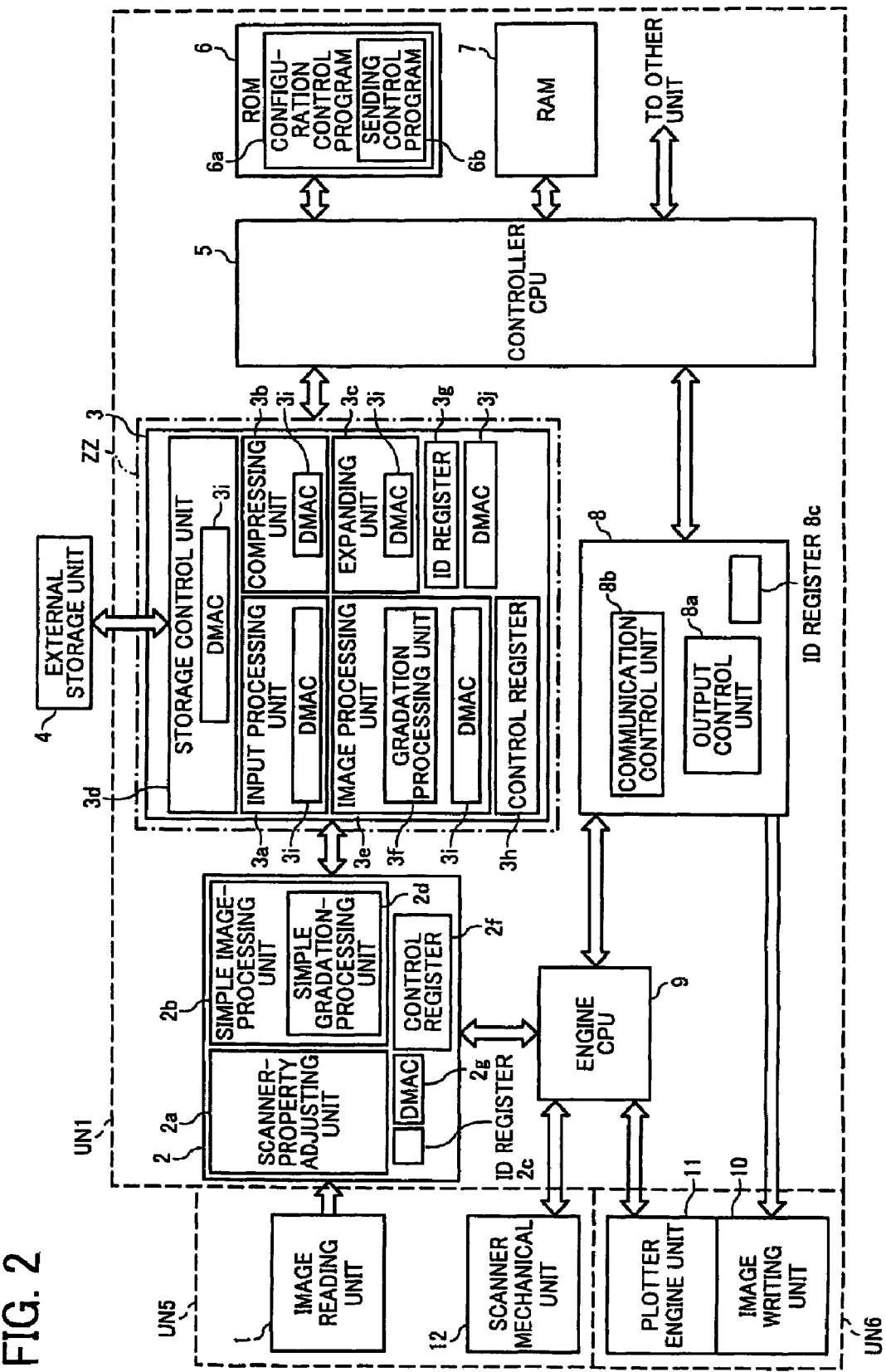
FIG. 2 is a block diagram of a controller unit shown in FIG. 1 when the image forming apparatus has a maximum configuration.

FIG. 2 is a block diagram of the controller unit UN1 in the image forming apparatus to which both the scanner unit UN5 and the plotter unit UN6 are connected. Particularly, a specific configuration of an image processing section of the image forming apparatus is explained. The configuration shown in FIG. 2 corresponds to so-called a maximum configuration. An option board 30a including a controller image-processing unit 3 is connected to the expansion I/F ZZ.

Image data output from an image reading unit 1 included in the scanner unit UN5 is sent to a scanner image-processing unit 2 included in the controller unit UN1.

The scanner image-processing unit 2 includes a scanner-property adjusting unit 2a and a simple image-processing unit 2b. The scanner-property adjusting unit 2a normalizes input image data. The simple image-processing unit 2b performs predetermined image processing on the normalized image data received from the scanner-property adjusting unit 2a thereby generating print image data.

A unit that is to perform an operation on received image data is determined among units included in the scanner image-processing unit 2 based on an operation mode value received from an engine CPU 9 or a controller CPU 5 included in the controller unit UN1.

The operation mode value is information for identifying a function to be performed by a unit included in the controller unit UN1. Specifically, a unit that is to perform a function is identified depending on an input operation mode value.

The scanner image-processing unit 2 further includes an identification (ID) register 2c, a control register 2f, and a direct memory access controller (DMAC) 2g. The ID register 2c stores therein an ID that is referred to by the controller CPU 5 to check the configuration and the property of the scanner image-processing unit 2. The control register 2f is used to set each function to be effective or ineffective. The DMAC 2g outputs data to a target unit.

Specifically, the DMAC 2g outputs image data processed by the scanner image-processing unit 2 to a target unit. In the first embodiment, the target unit can be the controller image-processing unit 3, the controller CPU 5, or a different unit connected via the controller CPU 5. When a target address to which image data is to be output is set in the DMAC 2g by the controller CPU 5 or the engine CPU 9, the DMAC 2g outputs the image data to the target address.

FIG. 3 is a table for explaining data stored in the control register 2f. An example of a relation between functions that are executable in each operation mode value is explained. If a value of a function is set to "1", the function is effective (ON), and if the value of the function is set to "0", the function is ineffective (OFF). A bit value is assigned to each of the functions. A type of the function assigned to each of the bit values is shared by the scanner image-processing unit 2 and the controller image-processing unit 3. Thus, a correspondence relationship between functions performed by the controller image-processing unit 3 and a function performed by the scanner image-processing unit 2 can be clearly defined. Therefore, it is possible to reduce workload of an operator for specifying settings as to whether each of the functions is to be performed.

A bit value is not used for a type of function that is not included in the scanner image-processing unit 2. In the example shown in FIG. 3, the bit "0", the bit "1", and the bit "4" are not used, and two functions assigned to the bits "2" and "3" can be selectively effective or ineffective.

Specifically, if the operation mode value is set to "0", both the scanner-property adjusting unit 2a assigned to the bit "2" and the simple image-processing unit 2b assigned to the bit "3" are operated. If the operation mode value is set to "1", only the scanner-property adjusting unit 2a is operated.

Because the control register 2f is connected to each of the units (the scanner-property adjusting unit 2a and the simple image-processing unit 2b) included in the scanner image-processing unit 2 with a signal line (not shown), or the like, each of the scanner-property adjusting unit 2a and the simple image-processing unit 2b can determine whether its function is to be performed by referring to the control register 2f.

Image processing (a normalization process of image data) performed by the scanner-property adjusting unit 2a includes, for example, shading compensation, gamma transformation, filtering, and color conversion. The color conversion is not the one from colors of red, green, and blue (RGB) to colors of cyan, magenta, yellow, and black (CMKY) but the one from the colors of RGB to the colors of RGB, and the color conversion is performed mainly to eliminate variation of reading the property of the scanner unit UN5 connected to the image forming apparatus, which is performed in a conventional technology.

Image processing performed by the simple image-processing unit 2b includes a color conversion process mainly from the colors of RGB to the colors of CMKY in accordance with an output format and a simple gradation process that is performed by a simple gradation-processing unit 2d included in the simple image-processing unit 2b.

An operation of the simple image-processing unit 2b can be set to be effective or ineffective in accordance with an instruction received from the engine CPU 9. If the operation of the simple image-processing unit 2b is set to be ineffective, data output from the scanner-property adjusting unit 2a is directly sent to the controller image-processing unit 3.

The controller image-processing unit 3 is detachably attached to the expansion I/F ZZ. Furthermore, the scanner image-processing unit 2 is connected to or removed from the image forming apparatus depending on the configuration of the image forming apparatus. For example, if the image forming apparatus has the configuration as a printer, the scanner unit UN5 is not connected to the image forming apparatus, and therefore the scanner image-processing unit 2 is removed from the image forming apparatus as described later.

The controller image-processing unit 3 receives image data from the scanner image-processing unit 2 via an input processing unit 3a included in the controller image-processing unit 3. The controller unit UN1 has a bridge configuration such that, if the controller image-processing unit 3 is not connected to the expansion I/F ZZ, image data output from the scanner image-processing unit 2 is directly sent to an output port of the expansion I/F ZZ and is input to the controller CPU 5.

To process image data received via the input processing unit 3a, the controller image-processing unit 3 further includes a compressing unit 3b that compresses data, an expanding unit 3c that expands data, a storage control unit 3d, and an image processing unit 3e. The storage control unit 3d stores data in an external storage unit (for example, a magnetic disk device) 4, and reads data from the external storage unit 4. The image processing unit 3e generates image data corresponding to an output format.

The image processing unit 3e performs a process such as color conversion from the colors of RGB to the colors of CMKY. The image processing unit 3e includes a gradation processing unit 3f that performs an advanced gradation process. Each of the input processing unit 3a, the compressing unit 3b, the expanding unit 3c, the storage control unit 3d, and the image processing unit 3e includes a DMAC 3i that sends data to a target unit. Alternatively, each of the input processing unit 3a, the compressing unit 3b, the expanding unit 3c, the storage control unit 3d, and the image processing unit 3e can send data directly to a target unit instead of the DMA. The DMAC 3i controls image data to be sent to a different unit included in the controller image-processing unit 3.

Moreover, the controller image-processing unit 3 includes an I/F circuit (not shown) to transmit and receive data to and from the controller CPU 5 that controls sending of image data and a DMAC 3j that sends data to a target unit. Although an I/F (not shown) is shared for inputting/outputting image data used by the DMAC 3j and connecting the controller CPU 5, dedicated I/Fs can be arranged. After an operation performed by the controller image-processing unit 3 ends, the DMAC 3j outputs image data to a target address set by the controller CPU 5.

The controller image-processing unit 3 further includes an ID register 3g and a control register 3h. The ID register 3g stores therein an ID that is referred to by the controller CPU 5 to check the configuration and the property of the controller image-processing unit 3. The control register 3h is used to set each function to be effective or ineffective.

FIG. 4 is a table for explaining data stored in the control register 3h. A function is assigned to each bit value. In an example shown in FIG. 4, the bit "3" is not used, and four functions assigned to the bits "0" to "2" and "4" can be selectively effective or ineffective. If a value of a function is set to "0", the function is ineffective (OFF), and if the value of the function is set to "1", the function is effective (ON).

Specifically, if the operation mode value is set to "0", all of the storage control unit 3d assigned to the bit "0", the expanding unit 3c assigned to the bit "1", the image processing unit 3e assigned to the bit "2", and the compressing unit 3b assigned to the bit "4" are operated. If the operation mode value is set to "1", only the image processing unit 3e, the compressing unit 3b, and the expanding unit 3c are operated.

Because the control register 3h is connected to each of the units (the image processing unit 3e, the compressing unit 3b, the expanding unit 3c, and the storage control unit 3d) included in the controller image-processing unit 3 with a signal line (not shown), or the like, each of the image processing unit 3e, the compressing unit 3b, the expanding unit 3c, and the storage control unit 3d can determine whether its function is to be performed by referring to the control register 3h.

Regardless of whether the controller image-processing unit 3 is connected to the expansion I/F ZZ, the controller CPU 5 that performs an operation in accordance with a sending control program 6b stored in a ROM 6 included in the controller unit UN1 sends the operation mode value "0" to, a unit directly connected to the controller CPU 5. If the controller image-processing unit 3 is not connected to the expansion I/F ZZ, the operation mode value "0" is input to the scanner image-processing unit 2. The operation mode value "0" is then set in the control register 2f.

On the other hand, if the controller image-processing unit 3 is connected to the expansion I/F ZZ, the operation mode value "0" is input to the controller image-processing unit 3. The operation mode value "0" is then set in the control register 3h. The operation mode value "1" is set in the scanner image-processing unit 2 by the engine CPU 9. In this manner, each unit can be selectively effective or ineffective.

Thus, the controller CPU 5 outputs the same operation mode value regardless of whether the controller image-processing unit 3 is connected to the expansion I/F ZZ whereby the controller CPU 5 can set each of the units included in the controller image-processing unit 3 or the scanner image-processing unit 2 that is directly connected to the controller CPU 5 to be effective or ineffective.

Referring back to FIG. 2, the ROM 6 stores therein data such as a computer program to be executed by the controller CPU 5, for example, a configuration control program 6a. The computer program is read by the controller CPU 5 so that the computer program performs a function as a configuration control unit.

The controller CPU 5 controls an operation of the controller unit UN1.

If the controller image-processing unit 3 is connected to the expansion I/F ZZ, the controller CPU 5, upon reading the configuration control program 6a, sets an operation of the simple image-processing unit 2b to be ineffective, causes the image processing unit 3e to perform image processing on image data adjusted by the scanner-property adjusting unit 2a to generate print image data, and causes the print image data to be output to a plotter image-processing unit 8 included in the controller unit UN1, and the like. If the controller image-processing unit 3 is not connected to the image forming apparatus, the controller CPU 5 causes the simple image-processing unit 2b with which the controller CPU 5 can directly communicate to generate print image data.

The controller CPU 5 sets each of the units to be effective or ineffective in accordance with the sending control program 6b. The controller CPU 5 sends the operation mode value (for example "0") to a unit (for example, the controller image-processing unit 3) that is directly connected to the controller CPU 5 and with which the controller CPU 5 can directly communicate. Specifically, if the controller image-processing unit 3 is connected to the expansion I/F ZZ, the controller CPU 5 sends the operation mode value to the controller image-processing unit 3.

Upon receiving the operation mode value, the controller image-processing unit 3 identifies an executable function based on the received operation mode value and processes data by using the function. Thus, an operation of each of the units included in the controller image-processing unit 3 can be set to be effective or ineffective.

On the other hand, if the option board 30a (including the controller image-processing unit 3) is not connected to the expansion I/F ZZ, the controller CPU 5 sends the operation mode value (for example "0") to the scanner image-processing unit 2. Thus, the scanner image-processing unit 2 identifies an executable function based on the operation mode value and processes data by using the function.

Furthermore, if the controller image-processing unit 3 is not connected to the expansion I/F ZZ, the controller CPU 5 specifies settings in the DMAC 2g with which the controller CPU 5 can directly communicate such that the DMAC 2g outputs image data generated by the simple image-processing unit 2b. Alternatively, if the controller image-processing unit 3 is connected to the expansion I/F ZZ, the controller CPU 5 specifies settings in the DMAC 3j with which the controller CPU 5 can directly communicate such that the DMAC 3j outputs image data generated by the controller image-processing unit 3.

Figure 5:
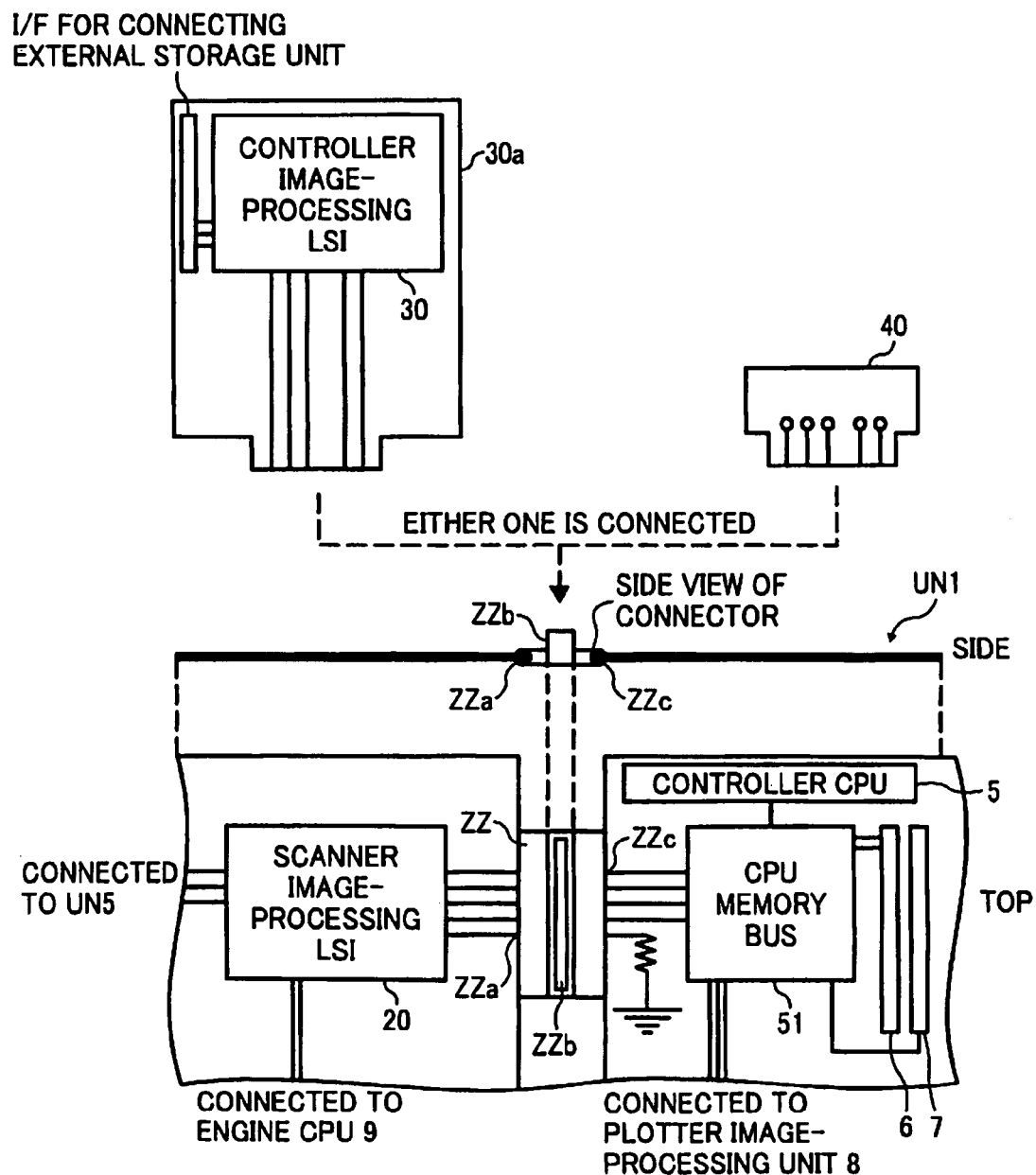
FIG. 5 is a schematic diagram for explaining an expansion I/F shown in FIG. 1 and an option board to be connected to the expansion I/F.

FIG. 5 is a schematic diagram for explaining the expansion I/F ZZ and the option board 30a to be connected to the expansion I/F ZZ. A controller image-processing large-scale integration (LSI) 30 mounted on the option board 30a performs a function of the controller image-processing unit 3, and a scanner image-processing LSI 20 performs a function of the scanner image-processing unit 2. A CPU memory bus 51 and the expansion I/F ZZ are arranged between the controller CPU 5 and the scanner image-processing LSI 20.

Figure 6:
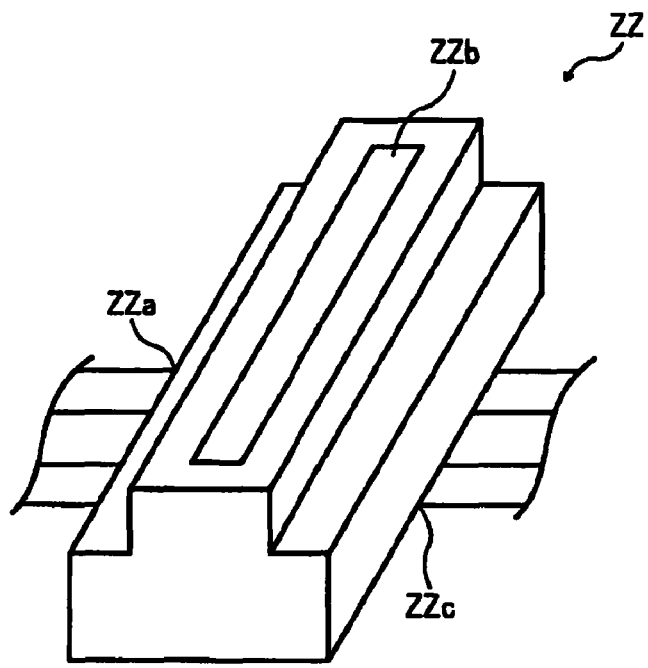
FIG. 6 is a schematic diagram for explaining the hardware configuration of the expansion I/F.

The expansion I/F ZZ includes three connection ports ZZa, ZZb, and ZZc. The scanner image-processing LSI 20 is connected to the CPU memory bus 51 via the connection ports ZZa and ZZc. A bypass board 40 is connected to the connection port ZZb when the image forming apparatus has the basic configuration, and the option board 30a is connected to the connection port ZZb when a function is to be extended. FIG. 6 is a schematic diagram for explaining the hardware configuration of the expansion I/F ZZ. The connection port ZZb has an opening to which the option board 30a is connectable.

As shown in FIG. 5, the connection ports ZZa and ZZc are arranged on sides of the expansion I/F ZZ in the horizontal direction of FIG. 5, and the connection port ZZb is arranged between the connection ports ZZa and ZZc in the vertical direction of FIG. 5.

Figure 7:
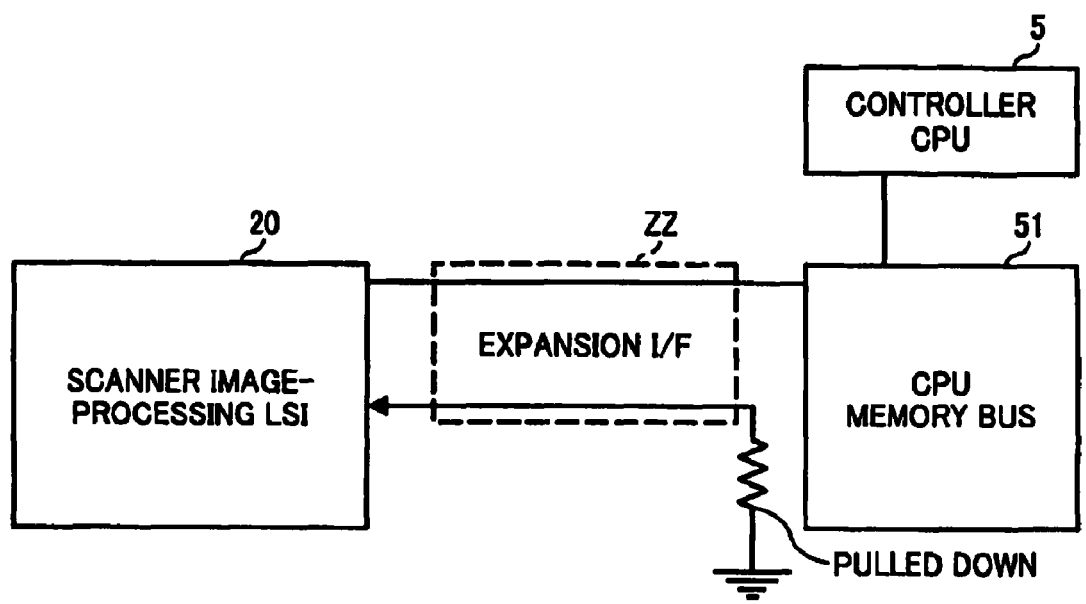
FIG. 7 is a schematic diagram for explaining the configuration of an scanner image-processing LSI shown in FIG. 5 and a CPU memory bus shown in FIG. 5 that are connected via a connector with wiring arranged on a bypass board shown in FIG. 5.

FIG. 7 is a schematic diagram for explaining the configuration of the scanner image-processing LSI 20 and the CPU memory bus 51 that are connected via a connector with wiring arranged on the bypass board 40. Specifically, when the image forming apparatus has the basic configuration, a data signal is directly transmitted between the scanner image-processing LSI 20 and the CPU memory bus 51 with the wiring arranged on the bypass board 40 connected to the connection port ZZb. Thus, the controller CPU 5 can directly send the operation mode value to the scanner image-processing LSI 20 via the CPU memory bus 51.

Figure 8:
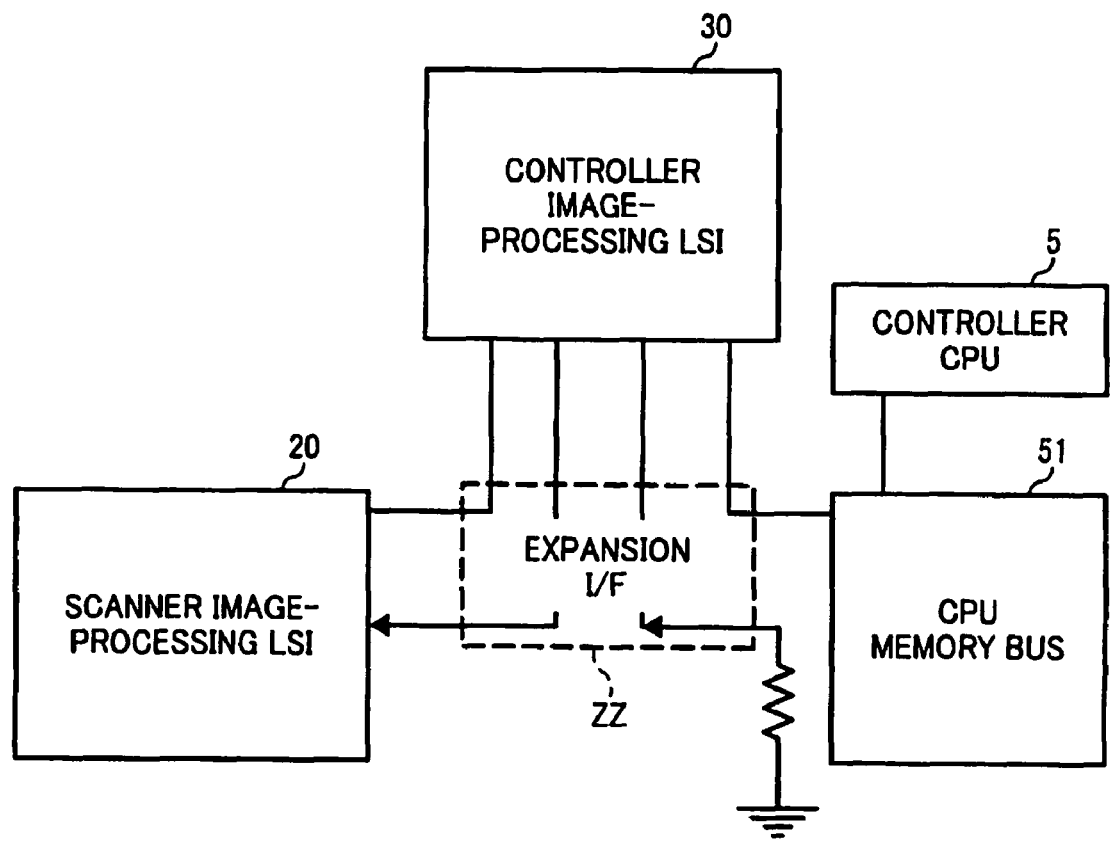
FIG. 8 is a schematic diagram for explaining the configuration of the scanner image-processing LSI, a controller image-processing LSI shown in FIG. 5, and the CPU memory bus that are connected via the connector with wiring arranged on the option board.

FIG. 8 is a schematic diagram for explaining the configuration of the scanner image-processing LSI 20, the controller image-processing LSI 30, and the CPU memory bus 51 that are connected via the connector with wiring arranged on the option board 30a. When the option board 30a is connected to the connection port ZZb, the CPU memory bus 51 is connected to the controller image-processing LSI 30 and the scanner image-processing LSI 20 is connected to the controller image-processing LSI 30 with the wiring arranged on the option board 30a. Data is transmitted between the CPU memory bus 51 and the controller image-processing LSI 30 and between the scanner image-processing LSI 20 and the controller image-processing LSI 30 by PCI Express.

Specifically, the controller unit UN1 has the configuration such that, if the controller image-processing unit 3 is not connected to the expansion I/F ZZ, the controller CPU 5 can directly communicate with the scanner image-processing unit 2, and if the controller image-processing unit 3 is connected to the expansion I/F ZZ, the controller CPU 5 can directly communicate with the controller image-processing unit 3 instead of the scanner image-processing unit 2 and the scanner image-processing unit 2 can directly communicate with the controller image-processing unit 3.

When the option board 30a is first connected to the expansion I/F ZZ, a computer program stored in the ROM 6 is updated. Thus, an option control program for controlling the controller image-processing LSI 30 is additionally stored in the ROM 6.

As shown in FIG. 5, each of the option board 30a and the bypass board 40 is formed in a flat plate shape, and a connecting portion arranged at the lower end of each of the option board 30a and the bypass board 40 is inserted into the expansion I/F ZZ. Alternatively, it is possible that the connecting portion of the option board 30a and an area in which the controller image-processing LSI 30 is implemented are arranged at right angles to each other, in other words, the connecting portion and the area are arranged in an L shape, so that a space can be effectively used above the expansion I/F ZZ.

Referring back to FIG. 2, a random access memory (RAM) 7 included in the controller unit UN1 includes a work area to be used when the controller CPU 5 performs an operation and a buffer area in which various data is temporarily stored.

Figure 9:
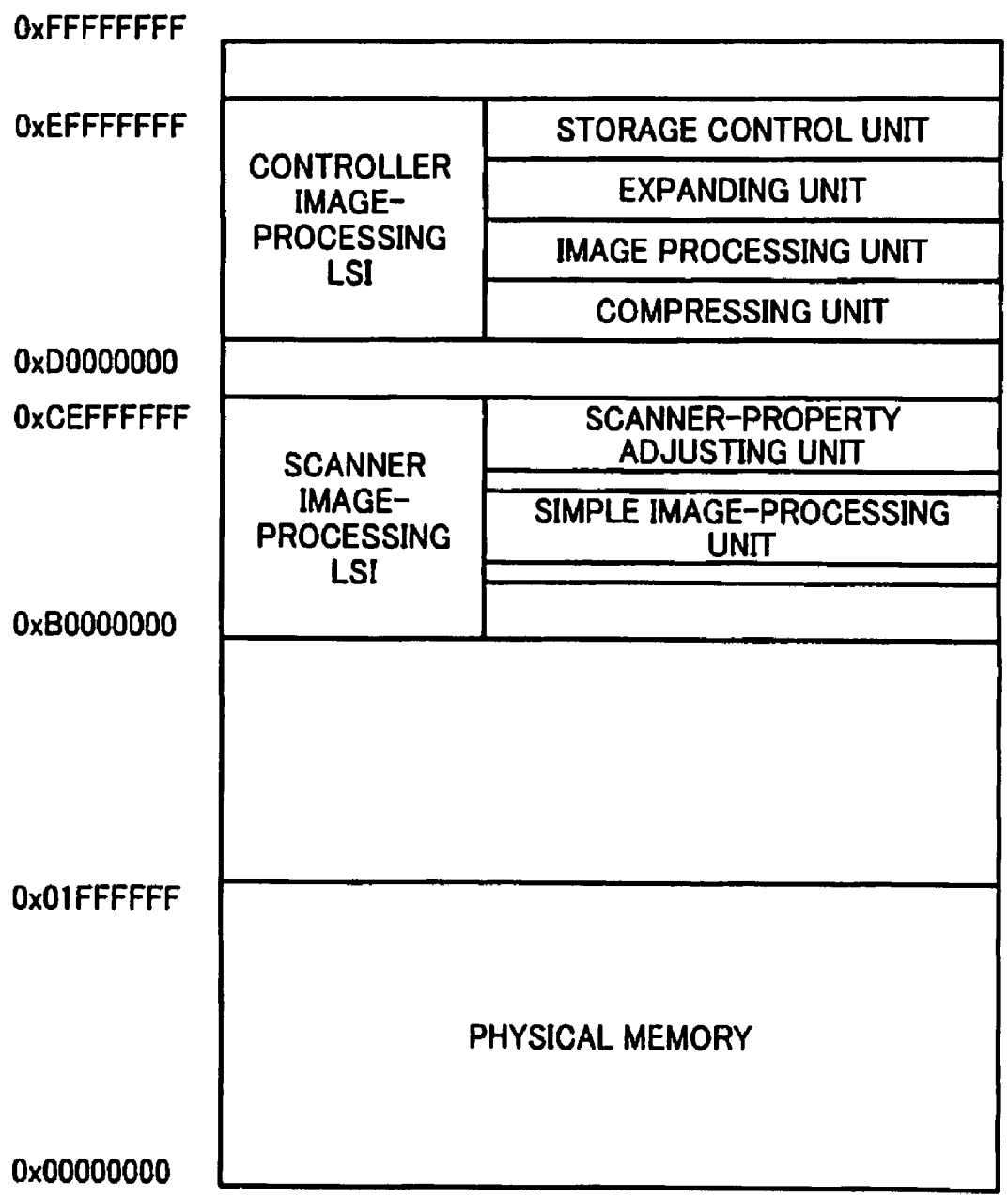
FIG. 9 is an example of arrangement of a group of registers included in the controller image-processing LSI and the scanner image-processing LSI in an address space of a RAM shown in FIG. 2.

FIG. 9 is an example of arrangement of a group of registers included in the controller image-processing LSI 30 and the scanner image-processing LSI 20 in an address space of the RAM 7. A register for each of the functions included in the scanner image-processing unit 2 and the controller image-processing unit 3 is divided by a specific address unit, for example 0x1000, a function ID register is arranged at its head, and a value of an ID is read by software so that presence of the function is identified.

The plotter image-processing unit 8 includes an output control unit 8a and a communication control unit 8b. The output control unit 8a sends image data corresponding to each of the four colors C, M, K, and Y to an image writing unit 10 included in the plotter unit UN6 at different timings. The communication control unit 8b performs communication between the controller CPU 5 and the engine CPU 9. Although not shown, the output control unit 8a includes a DMAC.

The plotter image-processing unit 8 includes an I/F (not shown) for connecting the controller CPU 5. Although the I/F is shared for inputting/outputting image data and connecting the controller CPU 5, dedicated I/Fs can be arranged. The plotter image-processing unit 8 further includes an ID register 8c that stores therein an ID that is referred to by the controller CPU 5 to check the configuration and the property of the plotter image-processing unit 8.

The engine CPU 9 sets an operation mode of the scanner image-processing unit 2 in accordance with an instruction received from the controller CPU 5, and controls operations of a plotter engine unit 11 included in the plotter unit UN6 and a scanner mechanical unit 12 included in the scanner unit UN5. The engine CPU 9 reads engine software (not shown) and performs an operation in accordance with the read engine software.

If the controller image-processing unit 3 is connected to the expansion I/F ZZ, the engine CPU 9 specifies settings in the scanner image-processing unit 2 such that the scanner image-processing unit 2 outputs image data to the controller image-processing unit 3. To specify the settings, a dummy address can be set as a target address to which data is to be output. When the dummy address is set as the target address, the scanner image-processing unit 2 sends image data to the controller image-processing unit 3 that is directly connected to the scanner image-processing unit 2. Upon receiving image data to which the dummy address is assigned, the controller image-processing unit 3 determines that the image data is to be processed by the controller image-processing unit 3.

The simple gradation process performed by the simple gradation-processing unit 2d is different from the advanced gradation process performed by the gradation processing unit 3f. Specifically, while data on which the simple gradation process has been performed has 2 bits and the number of tones is four, data on which the advanced gradation process has been performed has 4 bits and the number of tones is 16. Therefore, the advanced gradation process can generate image data with a larger number of tones and more improved reproducibility than the simple gradation process.

When the image forming apparatus has the maximum configuration shown in FIG. 2, the operation of the simple image-processing unit 2b is set to be ineffective by the settings based on the operation mode and the operation of the gradation processing unit 3f is performed on image data, so that it is possible to print out the image data with a larger number of tones.

Figure 10:
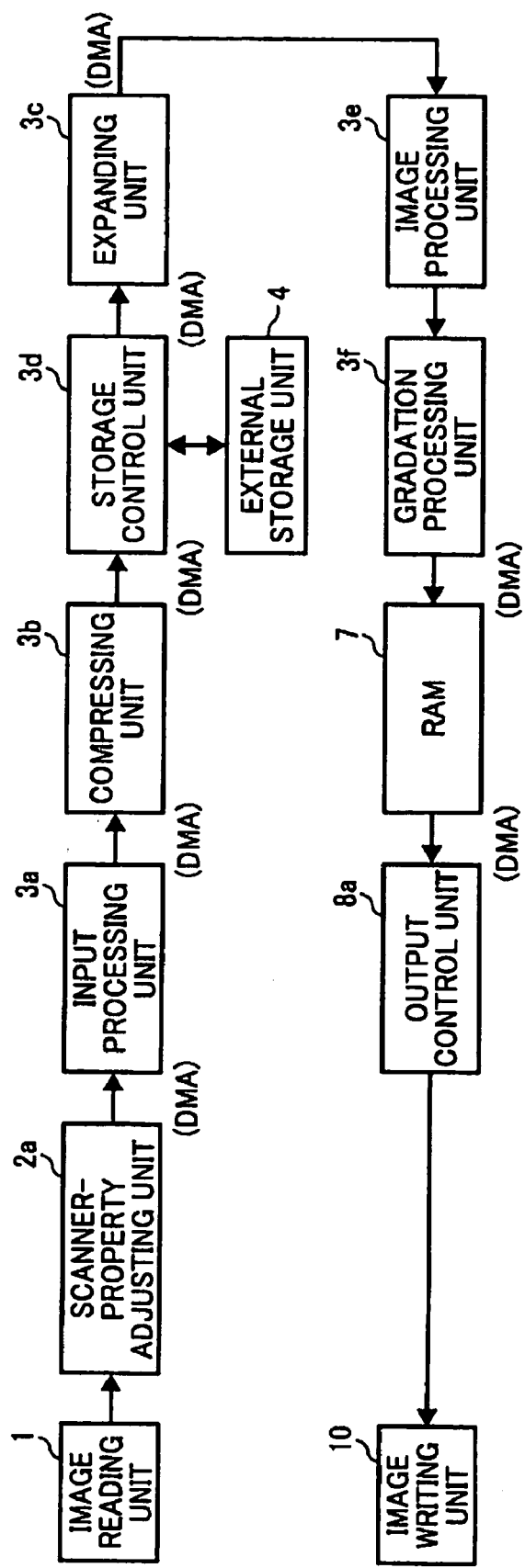
FIG. 10 is a block diagram for explaining an example of image data processing when the image forming apparatus has a maximum configuration shown in FIG. 2.

FIG. 10 is a block diagram for explaining an example of image data processing when the image forming apparatus has the maximum configuration.

In this case, the controller CPU 5 can access the controller image-processing unit 3 and the plotter image-processing unit 8. Therefore, the controller CPU 5 access the unit that is directly connected to the controller CPU 5 and reads an ID assigned to the unit. If the controller image-processing unit 3 is connected to the expansion I/F ZZ, the controller CPU 5 accesses the ID register 3g to read the ID stored in the ID register 3g. Furthermore, the controller CPU 5 accesses the ID register 8c to read the ID stored in the ID register 8c.

On the other hand, if the bypass board 40 is connected to the expansion I/F ZZ, the controller CPU 5 accesses the control register 2f to read the ID stored in the control register 2f.

The controller CPU 5 then sends the operation mode value "0" to the unit (for example, the controller image-processing unit 3 or the scanner image-processing unit 2) that is directly connected to the controller CPU 5 via the CPU memory bus 51. If the controller image-processing unit 3 is connected to the expansion I/F ZZ, the operations of the image processing unit 3e, the compressing unit 3b, the expanding unit 3c, and the storage control unit 3d are set to be effective.

The controller CPU 5 then examines the ID read from the unit directly connected to the controller CPU 5. If the image forming apparatus has the maximum configuration, because the value of the ID corresponds to a value indicating the controller image-processing unit 3, the controller CPU 5 determines the configuration of the image forming apparatus is the maximum configuration.

In this case, to set the operation of the simple image-processing unit 2b to be ineffective, the controller CPU 5 instructs the engine CPU 9 to set the operation mode (the operation mode value "1") in which the simple image-processing unit 2b is not to be used in the scanner image-processing unit 2 via the communication control unit 8b.

Thus, the engine CPU 9 sets the operation mode in which the simple image-processing unit 2b is not to be used in a control register (not shown) that sets the operation mode of the scanner image-processing unit 2.

After the operation mode is set as described above, the operation shown in FIG. 10 is performed. Specifically, image data is sent from the image reading unit 1 to the scanner-property adjusting unit 2a whereby each of the shading compensation, the gamma transformation, the filtering, and the color conversion is performed on the image data, and the processed image data is sent to the input processing unit 3a by the DMAC arranged on the output side of the scanner image-processing unit 2.

The input processing unit 3a sends the received image data to the compressing unit 3b by the DMA. The compressing unit 3b performs a predetermined compression process on the image data, and then sends the compressed image data to the storage control unit 3d by the DMA (or directly). The storage control unit 3d stores the received image data in the external storage unit 4 as appropriate.

When the compressed image data corresponding to one page or a predetermined amount of the compressed image data is stored in the external storage unit 4, the storage control unit 3d reads the compressed image data from the external storage unit 4 and sends the read image data to the expanding unit 3c by the DMA (or directly).

The expanding unit 3c converts the received compressed image data into original image data (an expansion process), and then sends the converted image data to the image processing unit 3e by the DMA (or directly). After the image processing unit 3e performs the color conversion on the received image data, the gradation processing unit 3f performs the gradation process on the image data, and then the processed image data (print data in the colors of CMKY) is sent to the RAM 7 by the DMA.

When the print data corresponding to one page or a predetermined amount of the print data is stored in the RAM 7, the controller CPU 5 sends the print data to the output control unit 8a by the DMA (or directly).

The output control unit 8a then sends the received print data to the image writing unit 10 in synchronization with print timing of the image writing unit 10. The image writing unit 10 writes an image corresponding to the print data on a recording medium, and then the recording medium is discharged.

Each of the DMAC 3j and the DMAC 2g stores data in the RAM 7 by sending the data while generating a memory address. Furthermore, each of the DMAC 3j and the DMAC 2g accesses the data stored in the RAM 7. Each of the DMAC 3j and the DMAC 2g employs a descriptor system in which continuous data sets are stored in a memory (not shown) in a divided manner and the data sets stored in the memory are accessed such that the data sets are automatically chained, so that memory management and image management can be performed by an operating system (OS) of controller software (the controller CPU 5). Because a value determined by the OS is set in the DMAC as a target address, address settings in the DMAC are performed by the controller CPU 5 that has read the configuration control program 6a.

Figure 11:
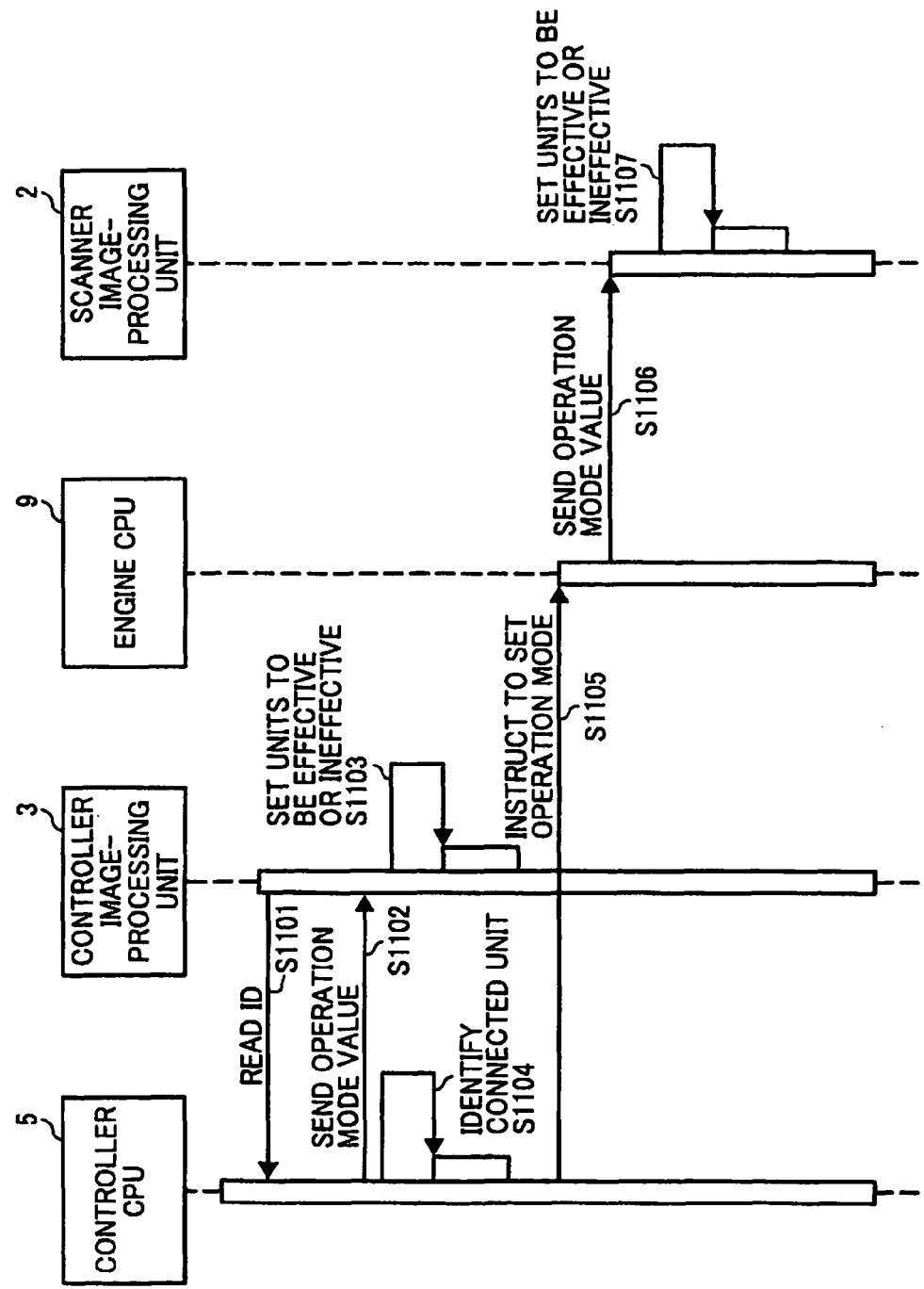
FIG. 11 is a sequence diagram of an operation performed by the image forming apparatus according to the first embodiment to set each function to be effective or ineffective.

FIG. 11 is a sequence diagram of an operation performed by the image forming apparatus according to the first embodiment to set each function to be effective or ineffective. The controller image-processing unit 3 is connected to the expansion I/F ZZ.

The controller CPU 5 reads the ID of the unit that is directly connected to the controller CPU 5 (Step S1101). In the operation according to the first embodiment, the controller CPU 5 reads the ID from the controller image-processing unit 3.

The controller CPU 5 sends the operation mode value "0" to the controller image-processing unit 3 (Step S1102). Thus, the controller image-processing unit 3 sets the operation mode value "0" in the control register 3h and sets each of the units to be effective or ineffective (Step S1103). In the operation according to the first embodiment, none of the functions is set to be ineffective.

The controller CPU 5 then identifies the unit that is directly connected to the controller CPU 5 based on the read ID (Step S1104). In the operation according to the first embodiment, the controller CPU 5 identifies the controller image-processing unit 3 that is connected to the expansion I/F ZZ.

If the controller CPU 5 determines that the controller image-processing unit 3 is connected to the expansion I/F ZZ, the controller CPU 5 notifies the engine CPU 9 that the image forming apparatus has the maximum configuration and instructs the engine CPU 9 to set the operation mode in the scanner image-processing unit 2 (Step S1105).

The engine CPU 9 then sends the operation mode value "1" to the scanner image-processing unit 2 (Step S1106). The scanner image-processing unit 2 sets the operation mode value "1" in the control register 2f and sets each of the units to be effective or ineffective (Step S1107). In the operation according to the first embodiment, the simple image-processing unit 2b is set to be ineffective.

In the operation described above, each of the functions can be set to be effective or ineffective in the scanner image-processing unit 2 and the controller image-processing unit 3 as appropriate. Thus, it is possible to simplify function expansion for data processing in accordance with introduction of an expansion unit and simplify implementation of linkage between expanded units.

If the controller image-processing unit 3 is not connected to the expansion I/F ZZ, the operations at Steps S1105 to S1107 are not performed. Because the operations at Steps S1101 to S1104 are the same as that described with reference to FIG. 11, its explanation is omitted.

Figure 12:
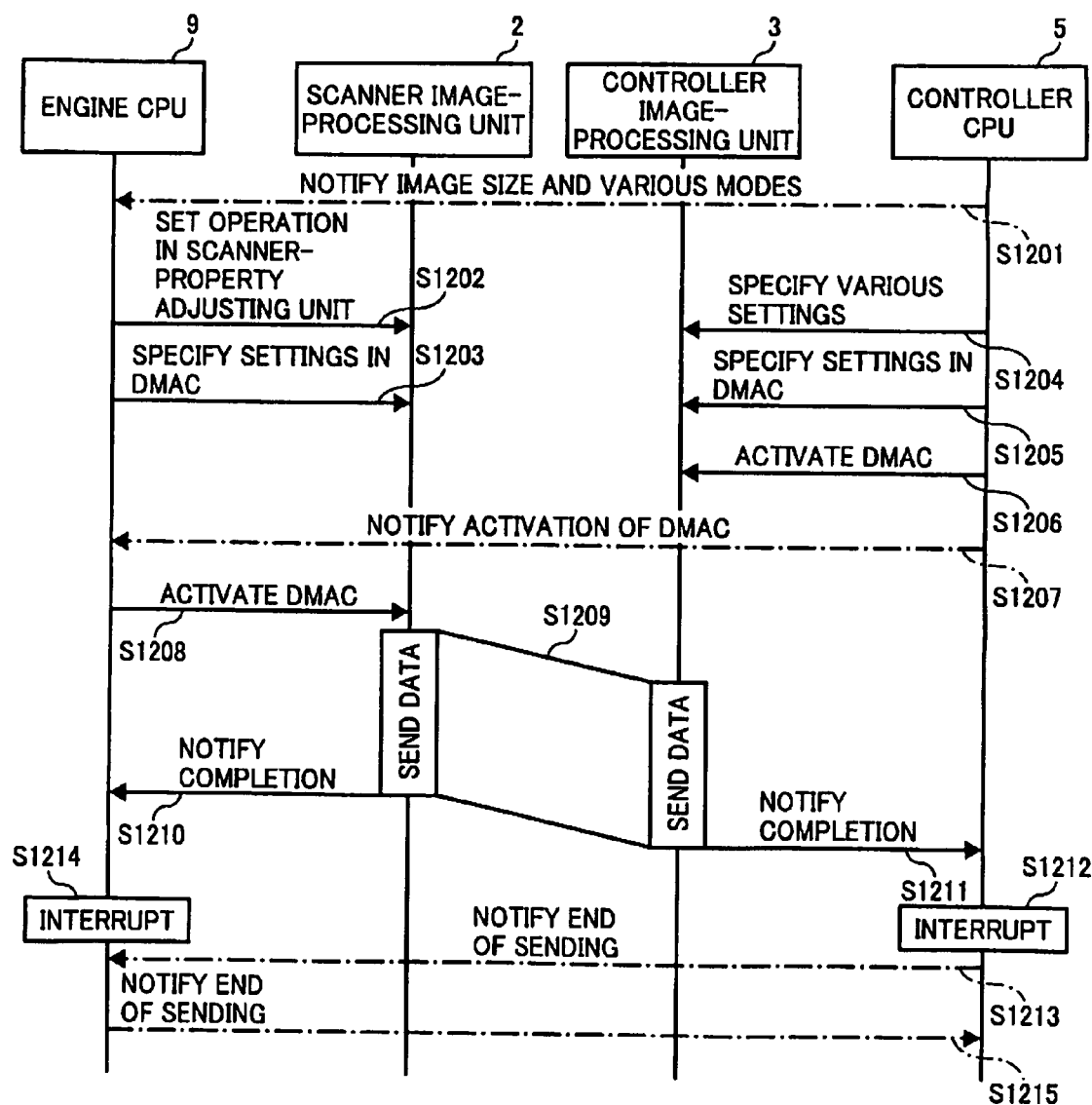
FIG. 12 is a sequence diagram of an operation performed by the image forming apparatus according to the first embodiment when the image forming apparatus has the maximum configuration.

FIG. 12 is a sequence diagram of an operation performed by the image forming apparatus when the image forming apparatus has the maximum configuration. It is assumed that each of the units is set to be effective or ineffective in the operation shown in FIG. 11.

In this case, although the controller CPU 5 can recognize the controller image-processing unit 3 and the plotter image-processing unit 8, the controller CPU 5 cannot recognize the scanner image-processing unit 2. Thus, the controller CPU 5 cannot access the scanner image-processing unit 2. Therefore, the engine CPU 9 needs to specify settings in the DMAC 2g such that data is sent from the scanner image-processing unit 2 to the controller image-processing unit 3.

Although a value assigned by the OS executed on the controller CPU 5 needs to be set in the DMAC 2g as a target address, the controller CPU 5 cannot access the scanner image-processing unit 2. Therefore, the engine CPU 9 sets a dummy address in the scanner image-processing unit 2, and controls the scanner image-processing unit 2 to output image data to the controller image-processing unit 3 that is directly connected to the scanner image-processing unit 2.

Specifically, upon reading the configuration control program 6a, the controller CPU 5 notifies the engine CPU 9 of an image size or various modes (Step S1201).

Thus, the engine CPU 9 sets an operation to be performed in the scanner-property adjusting unit 2a based on the image size and the various modes (Step S1202). Furthermore, the engine CPU 9 specifies settings in the DMAC 2g such that image data adjusted by the scanner-property adjusting unit 2a is sent from the scanner image-processing unit 2 to the controller image-processing unit 3 (Step S1203). The engine CPU 9 sets a dummy address in the DMAC 2g as a target address to which image data is to be output. The operation at Step S1203 is performed only if the engine CPU 9 determines that the image forming apparatus has the maximum configuration based on notification received from the controller CPU 5.

The controller CPU 5 specifies various settings in each of the units included in the controller image-processing unit 3, such as the image processing unit 3e, that is directly connected to the controller CPU 5 (Step S1204).

The controller CPU 5 then specifies settings in the DMAC 3j (Step S1205). As described above, a value (address) assigned by the OS is set in the DMAC 3j as a target address.

The controller CPU 5 then activates the DMAC 3j (Step S1206). The controller CPU 5 notifies the engine CPU 9 of the activation of the DMAC 3j (Step S1207).

Upon receiving notification from the controller CPU 5, the engine CPU 9 activates the DMAC 2g (Step S1208). Thus, the DMAC 2g sends the image data adjusted by the scanner-property adjusting unit 2a from the scanner image-processing unit 2 to the controller image-processing unit 3 (Step S1209). When the controller image-processing unit 3 receives the image data to which the dummy address is assigned from the scanner image-processing unit 2, the input processing unit 3a converts the dummy address into an address assigned by the OS of the controller software. The DMAC 3j then outputs the data to a controller memory (not shown).

The scanner image-processing unit 2 then notifies the engine CPU 9 of completion of data sending (Step S1210). Moreover, the controller image-processing unit 3 notifies the controller CPU 5 of completion of data sending (Step S1211).

The controller CPU 5 performs an interrupt process based on notification from the controller image processing unit 3 (Step S1212), and then notifies the engine CPU 9 of end of data sending (Step S1213).

The engine CPU 9 also performs an interrupt process based on notification from the scanner image-processing unit 2 (Step S1214), and then notifies the controller CPU 5 of end of data sending (Step S1215).

As described above, if the controller image-processing unit 3 is connected to the expansion I/F ZZ, data is sent by using the two DMACs, i.e., the DMAC 2g and the DMAC 3j.

Figure 13:
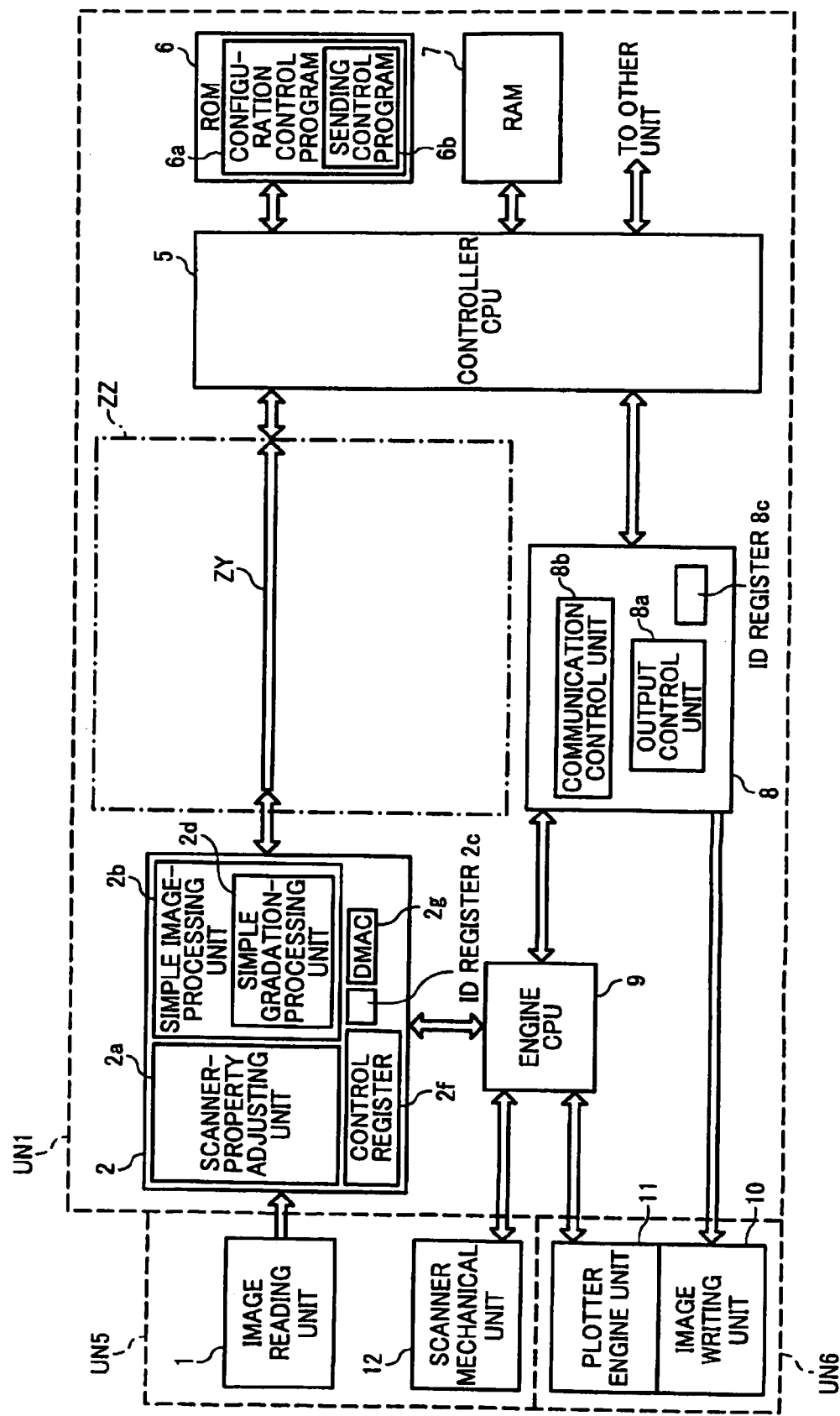
FIG. 13 is a block diagram of the controller unit when an image forming apparatus has a minimum configuration according to a second embodiment of the present invention.

FIG. 13 is a block diagram of the controller unit UN1 in an image forming apparatus to which both the scanner unit UN5 and the plotter unit UN6 are connected according to a second embodiment of the present invention. The configuration of the image processing section shown in FIG. 13 is different from that shown in FIG. 2. The configuration shown in FIG. 13 corresponds to so-called a minimum configuration. Identical and corresponding parts are indicated by the same reference numerals in FIG. 13 as those in FIG. 2, and their explanations are omitted.

In an example shown in FIG. 13, the controller image-processing unit 3 is not connected to the expansion I/F ZZ. The input port of the expansion I/F ZZ is connected to the output port of the scanner image-processing unit 2 and the output port of the expansion I/F ZZ is connected to an I/F (not shown) of the controller CPU 5 as shown in FIG. 7. The scanner image-processing unit 2 is connected to the controller CPU 5 via a signal line ZY of the bypass board 40 as shown in FIG. 13. Thus, the controller CPU 5 can access the scanner image-processing unit 2.

Figure 14:
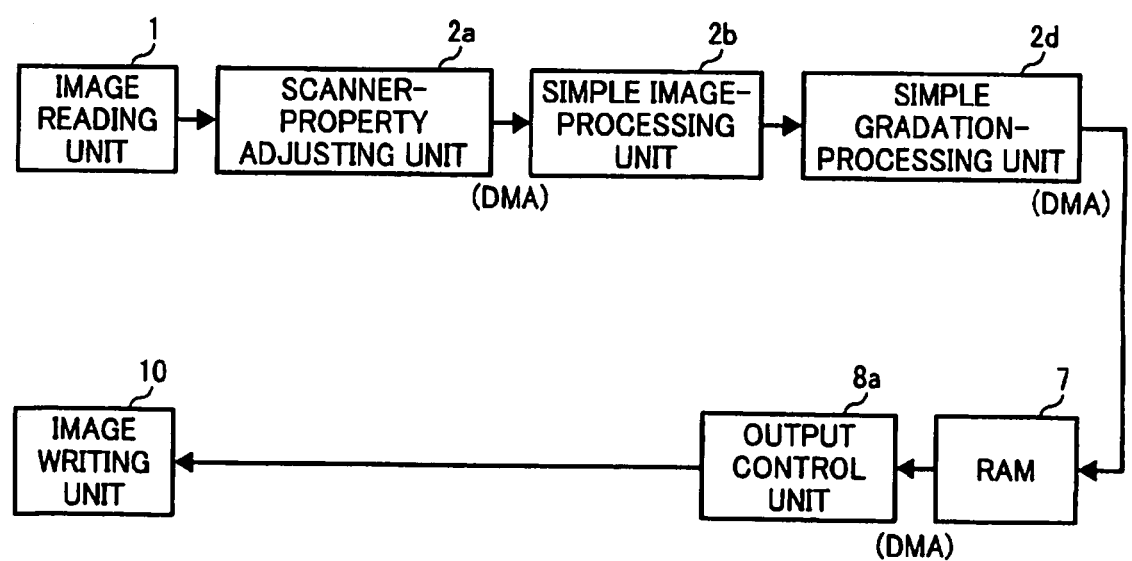
FIG. 14 is a block diagram for explaining an example of image data processing when the image forming apparatus has the minimum configuration.

FIG. 14 is a block diagram for explaining an example of image data processing when the image forming apparatus has the minimum configuration.

In this case, the controller CPU 5 can access the scanner image-processing unit 2 and the plotter image-processing unit 8. Therefore, the controller CPU 5 accesses the ID register 2c and the ID register 8c to read the IDs stored in the ID register 2c and the ID register 8c.

The controller CPU 5 examines the ID read from the ID register 2c. Because the value of the ID corresponds to a value indicating the scanner image-processing unit 2, the controller CPU 5 determines the configuration of the image forming apparatus is the minimum configuration.

To set the operation of the simple image-processing unit 2b to be effective, the controller CPU 5 instructs the engine CPU 9 to set the operation mode in which the simple image-processing unit 2b is to be used in the scanner image-processing unit 2 via the communication control unit 8b.

Thus, the engine CPU 9 sets the operation mode in which the simple image-processing unit 2b is to be used in the control register 2f that sets the operation mode of the scanner image-processing unit 2.

After the operation mode is set as described above, the operation shown in FIG. 14 is performed. Specifically, image data is sent from the image reading unit 1 to the scanner-property adjusting unit 2a whereby each of the shading compensation, the gamma transformation, the filtering, and the color conversion is performed on the image data, and the processed image data is sent to the simple image-processing unit 2b by the DMA. After the simple image-processing unit 2b performs the color conversion on the received image data, the simple gradation-processing unit 2d performs the gradation process, and the processed image data (print data in the colors of CMKY) is sent to the RAM 7 by the DMA.

When the print data corresponding to one page or a predetermined amount of the print data is stored in the RAM 7, the controller CPU 5 sends the print data to the output control unit 8*a* by the DMA.

The output control unit 8*a* then sends the received print data to the image writing unit 10 in synchronization with print timing of the image writing unit 10. The image writing unit 10 writes an image corresponding to the print data on a recording medium, and then the recording medium is discharged.

Figure 15:
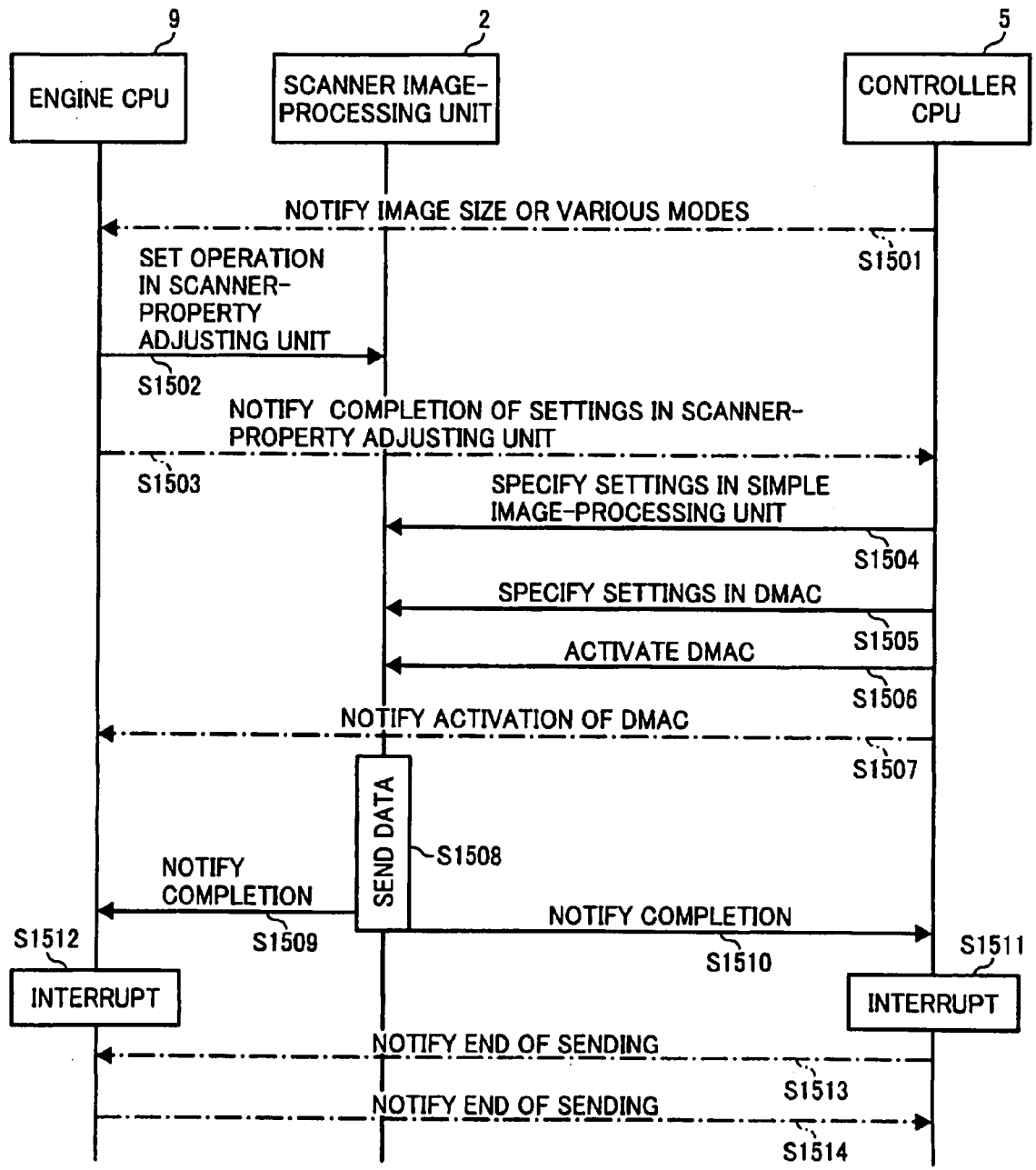
FIG. 15 is a sequence diagram of an operation performed by the image forming apparatus when the image forming apparatus has the minimum configuration.

FIG. 15 is a sequence diagram of an operation performed by the image forming apparatus when the image forming apparatus has the minimum configuration.

In this case, the controller CPU 5 that has executed the configuration control program 6*a* can recognize and access the scanner image-processing unit 2. Therefore, the controller CPU 5 can set an address in the DMAC 2*g* and activate the DMAC 2*g*. Because a value assigned by the OS of the controller software needs to be set in the DMAC 2*g*, the controller software specifies address settings in the DMAC 2*g* and activates the DMAC 2*g*.

Specifically, upon reading the configuration control program 6*a*, the controller CPU 5 notifies the engine CPU 9 of an image size or various modes (Step S1501).

Thus, the engine CPU 9 sets an operation to be performed in the scanner-property adjusting unit 2*a* based on the image size and the various modes (Step S1502). Afterward, the engine CPU 9 does not specify settings such that image data adjusted by the scanner-property adjusting unit 2*a* is sent from the scanner image-processing unit 2 to the controller image-processing unit 3 as described with reference to FIG. 12. Instead, the engine CPU 9 notifies the controller CPU 5 of completion of the settings in the scanner-property adjusting unit 2*a* (Step S1503).

The controller CPU 5 then specifies settings in the simple image-processing unit 2*b* that is directly connected to the controller CPU 5 (Step S1504).

The controller CPU 5 then specifies settings in the DMAC 2*g* (Step S1505). As described above, a value (address) assigned by the OS is set in the DMAC 2*g* as a target address.

The controller CPU 5 then activates the DMAC 2*g* (Step S1506), and notifies the engine CPU 9 of the activation of the DMAC 2*g* (Step S1507).

The DMAC 2*g* then sends image data on which image processing has been performed by the simple image-processing unit 2*b* to the target address (Step S1508).

The scanner image-processing unit 2 notifies the engine CPU 9 of completion of data sending (Step S1509). Furthermore, the scanner image-processing unit 2 notifies the controller CPU 5 of completion of data sending (Step S1510).

The controller CPU 5 performs an interrupt process based on notification from the scanner image-processing unit 2 (Step S1511), and then notifies the engine CPU 9 of end of data sending (Step S1513).

The engine CPU 9 also performs an interrupt process based on notification from the scanner image-processing unit 2 (Step S1512), and then notifies the controller CPU 5 of end of data sending (Step S1514).

Settings of each of the scanner-property adjusting unit 2*a* and the simple image-processing unit 2*b* can be performed by both the controller CPU 5 and the engine CPU 9. However, to reduce the difference between the operations performed in the maximum configuration and the minimum configuration, the engine software read by the engine CPU 9 controls the scanner-property adjusting unit 2*a*, and the configuration control program 6*a* read by the controller CPU 5 controls the simple image-processing unit 2*b*. Thus, because the difference between the operations in the maximum configuration and the minimum configuration is reduced, load for development of software is reduced.

When the minimum configuration is to be changed to the maximum configuration, an additional operation to be performed by the engine software is only an operation of setting a dummy address in the DMAC 2*g*. Moreover, the controller software needs to control the controller image-processing unit 3 instead of controlling the simple image processing.

The configuration of the image forming apparatus is not limited to those described above. It is possible to attach or remove each of the units UN2 to UN6 to or from the image forming apparatus if necessary.

Figure 16:
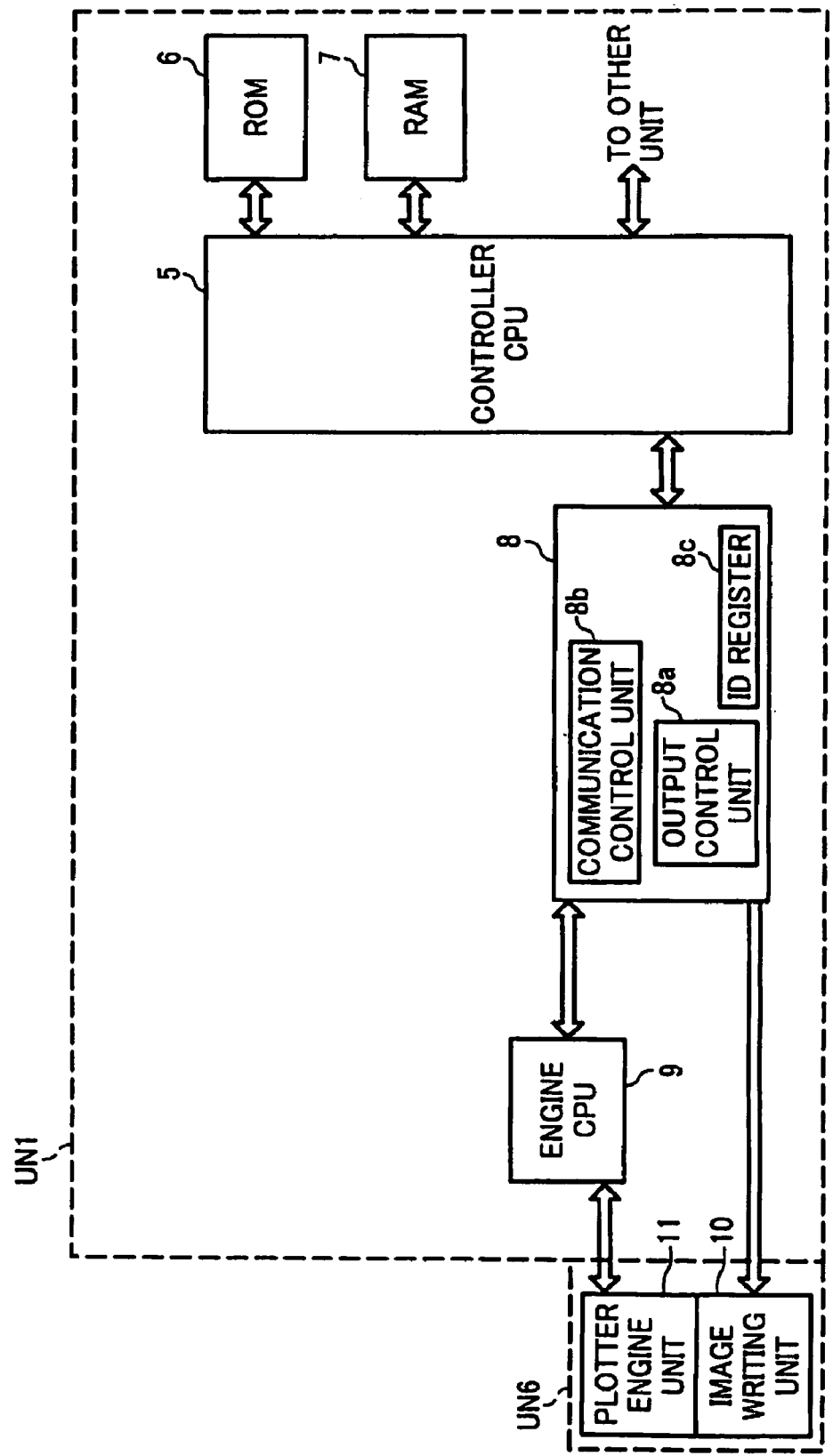
FIG. 16 is a block diagram of the controller unit when an image forming apparatus has a configuration as a printer according to a third embodiment of the present invention.

FIG. 16 is a block diagram of the controller unit UN1 in an image forming apparatus having a configuration (a configuration as a printer) in which the scanner unit UN5 is removed from the image forming apparatus and the plotter unit UN6 is attached to the image forming apparatus according to a third embodiment of the present invention. The configuration of the image processing section shown in FIG. 16 is different from that shown in FIG. 2. Identical and corresponding parts are indicated by the same reference numerals in FIG. 16 as those in FIG. 2, and their explanations are omitted.

In an example shown in FIG. 16, the scanner image-processing unit 2 is removed from the controller unit UN1, and the controller image-processing unit 3 is not connected to the expansion I/F ZZ.

In this case, print data received via the communication unit UN4 is temporarily stored in the RAM 7, and when the print data corresponding to one page or a predetermined amount of the print data is stored in the RAM 7, the controller CPU 5 sends the print data to the output control unit 8*a* by the DMA.

The output control unit 8*a* then sends the received print data to the image writing unit 10 in synchronization with print timing of the image writing unit 10. The image writing unit 10 writes an image corresponding to the print data on a recording medium, and then the recording medium is discharged.

FIG. 17 is a flowchart of an operation performed by the controller unit UN1 to determine the configuration of the image forming apparatus.

When the power is applied to the image forming apparatus, the controller CPU 5 reads the configuration control program 6*a*. The controller CPU 5 then determines whether any unit (the scanner image-processing unit 2 or the controller image-processing unit 3) is connected to the I/F arranged on the side of the scanner unit UN5 (Step S1701). If it is determined that no unit is connected to the I/F (No at Step S1701), the controller CPU 5 determines that the image forming apparatus has the configuration as a printer rather than a copier and that a target unit to be controlled is only the plotter image-processing unit 8. The controller CPU 5 notifies the engine CPU 9 that the image forming apparatus has the configuration as a printer (Step S1702) and controls the plotter image-processing unit 8 (Step S1703).

On the other hand, if it is determined that a unit is connected to the I/F (Yes at Step S1701), the controller CPU 5 reads the ID from the connected unit. The controller CPU 5 then determines whether the controller image-processing unit 3 is connected to the I/F based on the read ID (Step S1704). If it is determined that the controller image-processing unit 3 is connected to the I/F (Yes at Step S1704), the controller CPU 5 determines that the image forming apparatus has the maximum configuration as the copier and that target units to be controlled are the controller image-processing unit 3 and the plotter image-processing unit 8. The controller CPU 5 notifies the engine CPU 9 that the image forming apparatus has the maximum configuration (Step S1705) and controls the controller image-processing unit 3 and the plotter image-processing unit 8 (Step S1706). When the engine CPU 9 is notified that the image forming apparatus has the maximum configuration, the engine CPU 9 controls the scanner image-processing unit 2.

On the other hand, if it is determined that the controller image-processing unit 3 is not connected to the I/F, i.e., the scanner image-processing unit 2 is connected to the I/F (No at Step S1704), the controller CPU 5 determines that the image forming apparatus has the minimum configuration and that target units to be controlled are the scanner image-processing unit 2 and the plotter image-processing unit 8. The controller CPU 5 then notifies the engine CPU 9 that the image forming apparatus has the minimum configuration (Step S1707) and controls the simple image-processing unit 2*b* and the plotter image-processing unit 8 (Step S1708).

Thus, the image forming apparatus can control each of the units depending on whether a target unit is attached to or removed from the image forming apparatus. Because a process to be performed by the image forming apparatus is selected depending on whether a target unit is attached to or removed from the image forming apparatus, the configuration control program 6*a* executed by the controller CPU 5 does not need to be changed depending on the configuration of the image forming apparatus, which results in reduction of development man-hours and development load.

Although image data compressed by a predetermined compression process is stored in the external storage unit 4, an encryption process can be further performed on the image data to be stored in the external storage unit 4. In this manner, if the external storage unit 4 is taken away by an unauthorized person, it is possible to prevent the image data stored in the external storage unit 4 from being used by the unauthorized person.

In the image forming apparatus according to the embodiment, the controller image-processing unit 3 and other various units can be easily attached to or removed from the image forming apparatus. Thus, the image forming apparatus can be provided in accordance with a user request in an easy manner. Moreover, even if various types of image forming apparatuses having different configurations are to be provided, the computer program (for example, the configuration control program 6*a* or the engine program) for controlling the image forming apparatus can be the same or changed little, which results in reduction of development load.

The computer program (for example, the configuration control program 6*a* or the engine program) for controlling the image forming apparatus can be provided such that the computer program is installed in a ROM or the like in advance.

Alternatively, the computer program can be provided such that the computer program is stored, in a form of a file that is installable and executable on a computer, in a recording medium readable by the computer, such as a compact disk-read only memory (CD-ROM), a flexible disk (FD), a compact disk-recordable (CD-R), or a digital versatile disk (DVD).

On the other hand, the computer program can be provided such that the computer program is stored in another computer connected to the computer via a network such as the Internet, and downloaded to the computer via the network. The computer program can be delivered or distributed via a network such as the Internet.

The computer program is made up of modules including the units that perform various operations. As hardware, the controller CPU 5 or the engine CPU 9 reads the computer program from the RAM 7 or the like and executes the read computer program, so that each of the units is loaded and created on a main storage device.

According to an aspect of the present invention, the image forming apparatus having a plurality of functions can be provided in an easy manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controller unit that controls an image processing apparatus that includes a scanner unit that reads an image of an original and outputs image data, the controller unit comprising:
   a scanner image-processing unit including
      a scanner-property adjusting unit that converts the image data from the scanner unit into normalized image data, and
      a first image processing unit that performs a first image processing on the normalized image data to generate first output image data; and
   a configuration control unit that, if a controller image-processing unit that performs a second image processing on the image data from the scanner unit is connected, disables an operation of the first image processing unit and controls the controller image-processing unit to perform the second image processing on the normalized image data to generate second output image data,
   wherein if the controller image-processing unit is not connected, the configuration control unit directly communicates with the scanner image-processing unit,
   if the controller image-processing unit is connected, the configuration control unit directly communicates with the controller image-processing unit, and the scanner image-processing unit directly communicates with the controller image-processing unit,
   the scanner image-processing unit further includes a first image output unit that outputs the first output image data,
   the controller image-processing unit includes a second image output unit that outputs the second output image data, and if the controller image-processing unit is not connected, the configuration control unit specifies a setting in the first image output unit such that the first image output unit outputs the first output image data, and if the controller image-processing unit is connected, the configuration control unit specifies a setting in the second image output unit such that the second image output unit outputs the second output image data, and
   the controller unit further includes an engine control unit that, if the controller image-processing unit is connected, specifies a setting in the first image output unit such that the first image output unit outputs the first output image data to the controller image-processing unit.

2. The controller unit according to claim 1, wherein
   if the controller image-processing unit is not connected, the configuration control unit controls the first image processing unit to perform the first image processing on the normalized image data to generate the first output image data.

3. The controller unit according to claim 1, wherein
   if the controller image-processing unit is connected, the engine control unit sets a dummy address to which the first output image data is to be output in the first image output unit, and the controller image-processing unit converts the dummy address into a predetermined address and controls the second image output unit to output the second output image data to the predetermined address.

4. The controller unit according to claim 1, wherein the controller image-processing unit further includes
a preprocessing unit that performs a preprocessing to compress the image data from the scanner by a predetermined compression method to obtain compressed image data, and
a post-processing unit that performs a post-processing to decompress the compressed image data.

5. The controller unit according to claim 1, wherein the first image processing is less complex than the second image processing.

6. The controller unit according to claim 1, wherein the image processing apparatus further includes a plotter unit that prints out an image on a recording medium, and the controller unit further comprises an output control unit that outputs either one of the first output image data and the second output image data to the plotter unit in accordance with a print timing of the plotter unit.

7. The controller unit according to claim 1, wherein the configuration control unit further includes a reading unit that reads an identification from a unit with which the configuration control unit can directly communicate, and
if the controller image-processing unit is connected, the reading unit reads a first identification from the controller image-processing unit, and if the controller image-processing unit is not connected, the reading unit reads a second identification from the first image processing unit, so that the configuration control unit determines whether the controller image-processing unit is connected to the image processing apparatus based on read identification.

8. The controller unit according to claim 7, wherein if the reading unit cannot read either one of the first identification and the second identification, the configuration control unit controls an operation of the image processing apparatus as a printer.

9. The controller unit according to claim 1, wherein the controller image-processing unit connected to the controller unit includes
a storage control unit that stores the normalized image data in an external storage unit, and
a second image processing unit that performs the second image processing on image data read from the external storage unit to generate third output image data.

10. A method of controlling an image processing apparatus that includes a scanner unit that reads an image of an original and outputs image data, the method comprising:
converting the image data from the scanner unit into normalized image data;
first image processing including performing a first image processing on the normalized image data to generate first output image data; and
configuration controlling including
disabling, if a controller image-processing unit that performs a second image processing on the image data from the scanner unit is connected, an operation of the first image processing, and controlling the controller image-processing unit to perform the second image processing on the normalized image data to generate second output image data,
wherein if the controller image-processing unit is not connected, the configuration controlling includes controlling the first image processing to perform the first image processing on the normalized image data to generate the first output image data,
the converting includes a first image outputting including outputting the first output image data,
the configuration controlling further includes second image outputting including outputting the second output image data,
if the controller image-processing unit is not connected, the configuration controlling further includes specifying a setting in which the first image outputting includes outputting the first output image data, and if the controller image-processing unit is connected, the configuration controlling includes specifying a setting in which the second image outputting includes outputting the second output image data, and
the method further includes engine controlling including, if the controller image-processing unit is connected, specifying a setting in which the first image outputting includes outputting the first output image data to the controller image-processing unit.

11. The method according to claim 10, further comprising storing including the controller image-processing unit storing the normalized image data in an external storage unit.

12. A non-transitory computer-readable recording medium that stores there in a computer program for controlling an image processing apparatus that includes a scanner unit that reads an image of an original and outputs image data, the computer program when executed causing a computer to execute:
converting the image data from the scanner unit into normalized image data;
first image processing including performing a first image processing on the normalized image data to generate first output image data; and
configuration controlling including
disabling, if a controller image-processing unit that performs a second image processing on the image data from the scanner unit is connected, an operation of the first image processing, and controlling the controller image-processing unit to perform the second image processing on the normalized image data to generate second output image data,
wherein if the controller image-processing unit is not connected, the configuration controlling includes controlling the first image processing to perform the first image processing on the normalized image data to generate the first output image data,
the converting includes a first image outputting including outputting the first output image data,
the configuration controlling further includes second image outputting including outputting the second output image data,
if the controller image processing unit is not connected, the configuration controlling further includes specifying a setting in which the first image outputting includes outputting the first output image data, and if the controller image-processing unit is connected, the configuration controlling includes specifying a setting in which the second image outputting includes outputting the second output image data, and the method further includes engine controlling including, if the controller image-processing unit is connected, specifying a setting in which the first image outputting includes outputting the first output image data to the controller image-processing unit.

13. The computer-readable recording medium according to claim 12, wherein the computer program further causes the computer to execute storing including the controller image-processing unit storing the normalized image data in an external storage unit.

* * * * *